Nov. 13, 1956 J. R. SHAFER ET AL 2,770,246
MULTIPLE CAM LOAD DEVICES FOR PRESSURE REGULATORS
Filed June 18, 1953 2 Sheets-Sheet 2
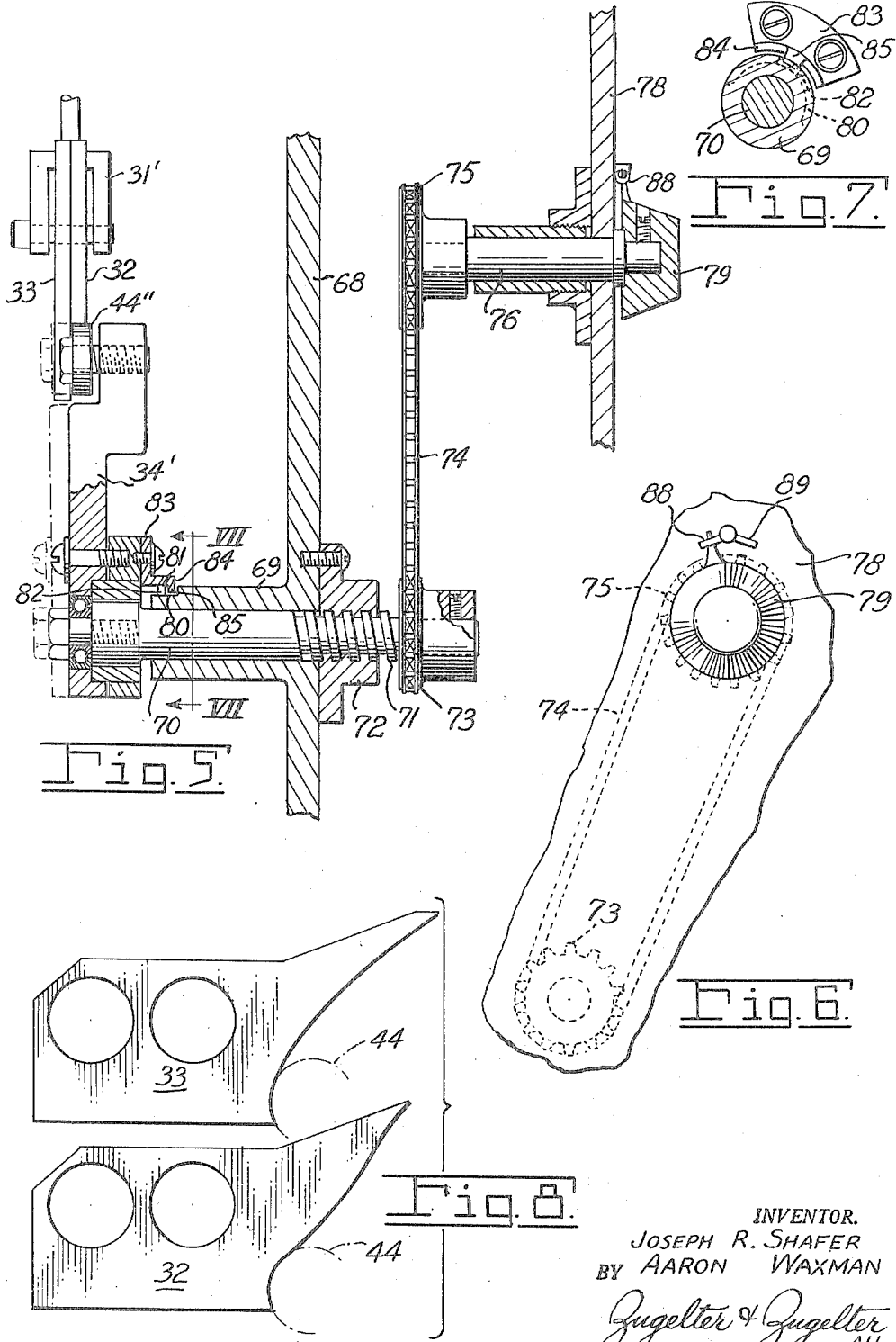
INVENTOR.
JOSEPH R. SHAFER
BY AARON WAXMAN
Jugelter & Jugelter
Attys.

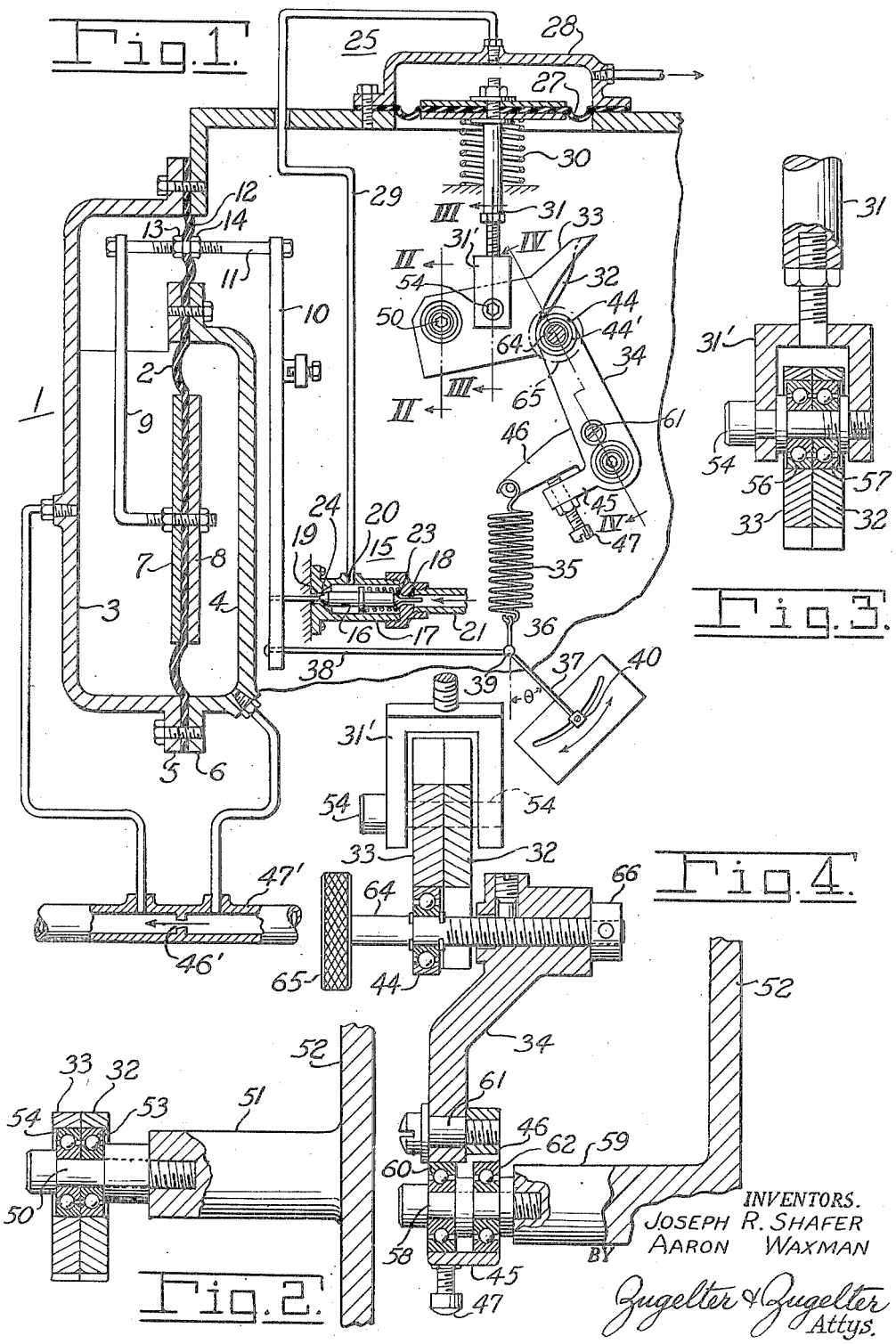

United States Patent Office 2,770,246
Patented Nov. 13, 1956

2,770,246

MULTIPLE CAM LOAD DEVICES FOR PRESSURE REGULATORS

Joseph R. Shafer, Rolling Hills, and Aaron Waxman, Bellflower, Calif., assignors to Hagan Corporation, Pittsburgh, Pa., a corporation of Pennsylvania Application June 18, 1953, Serial No. 362,594

2 Claims. (Cl. 137—85)

This invention relates to regulators of a variable condition, and more particularly to regulators provided with means for imposing a loading on the regulator of such nature that the variable condition and the output may be caused to selectively bear either a linear or an exponential functional relation to each other.

An object of this invention is to provide a regulator with a plurality of loading cams and means for selecting one or the other of them so that the regulator may be caused to function in accordance with the characteristics of the respective cams.

When a regulator of the type shown in Donaldson Patent No. 2,352,312 is used for regulating the flow of gas to a burner, a cam having a linear characteristic may be employed; however, if the regulator is to be used to regulate oil to a burner, a cam having different characteristics, such as a square root characteristic, may be required and substituted for it. In cases where a burner can be supplied with either oil or gas, depending on which is available, the changing of cams in prior art machines is not only inconvenient, but also may result in a shutdown or the operation of the burners for a prolonged time on manual control.

An object of this invention is to provide a regulator having a plurality of cams for one type of fuel, and another for a different type of fuel, and mechanisms whereby the cams may be put in or taken out of action on the regulator without disturbing the regulator, taking it apart to the extent required, or otherwise disrupting operations controlled by the regulator.

The above and other objects of the invention will be apparent to those of ordinary skill in the art to which the invention pertains, from the following description and the accompanying drawings.

In the drawings:

Figure 1 is a view in vertical section of a regulator arranged and constructed in accordance with an embodiment of the invention, the regulator having an element connected to respond to a pressure difference across an orifice in a pipe line;

Fig. 2 is a view in section taken on line II—II;

Fig. 3 is a view in section taken on line III—III;

Fig. 4 is a view in section taken on line IV—IV;

Fig. 5 is a more or less diagrammatic view of a modified form of mechanism for shifting from one cam to another;

Fig. 6 is a view in front elevation showing the mechanism whereby the regulator may be controlled from one cam or another;

Fig. 7 is a view in section taken on line VII—VII of Fig. 5; and

Fig. 8 is a side view of cam levers embodied in the clevis of Figs. 1 and 5.

In Fig. 1 of the drawings is illustrated a condition-responsive device 1 of a type, for example, which may be made responsive to a variable pressure or a variable pressure difference.

Device 1 includes a diaphragm 2 mounted in a pressure-tight housing composed of members 3 and 4. The marginal edge of the diaphragm is clamped between mating flanges 5 and 6 of the housing parts 3 and 4. The central portion of the diaphragm is clamped between a pair of plates 7 and 8. Motion of the diaphragm is transmitted to the outside of the housing by means of a system of levers 9 and 10, which are connected by a link 11. Link 11 extends through a sealing diaphragm 12, and is secured thereto in pressure-tight relationship by nuts 13 and 14.

As the diaphragm 2 deflects, the motion thereof may be utilized to actuate an output device 15. Output device 15 may, for example, comprise an escapement valve 16 disposed within a valve body 17, which is provided with an inlet port 18, and exhaust port 19, and an outlet port 20. The inlet port 18 is connected to a supply pipe 21, to which is supplied a pressure medium, such as compressed air, at constant pressure. The inlet port 18 and the exhaust port 19 are controlled by tapered or conical valve surfaces 23 and 24 at the ends of valve 16.

When the valve 16 is in a position to completely close inlet port 18, the pressure at the outlet port 20 will be atmospheric or zero gauge pressure. If valve 16 is in the position to completely close the exhaust port 19, the pressure at the outlet port 20 will be equal to the pressure in the supply pipe 21. For intermediate positions of valve 16, the pressure delivered to the outlet port 20 will vary from zero gauge pressure to the maximum value of pressure in the supply pipe.

In order that the position of diaphragm 2 may be caused to bear a predetermined relationship with the value of pressure to which it responds, a mechanism 25, actuated by pressure from port 20, is utilized to impose a restraining force on the diaphragm 2. That mechanism may be of the form illustrated in Donaldson Patent No. 2,352,312. As illustrated it comprises a diaphragm 27 mounted in a housing 28, to which the pressure from the outlet port 20 is communicated through a pipe 29. The pressure acting on diaphragm 27 is resisted by a spring 30. The diaphragm 27 is connected by a link 31 and a clevis 31' to a plurality of cam levers 32 and 33. The forms of these levers is shown in Fig. 8. Either one of these cams may be caused to coact with a cam follower lever 34 which, in turn, transmits a force to a spring 35, connected by a linkage composed of links 36, 37 and 38, to lever 10.

The links 36, 37 and 38 are connected at a common bearing 39. The opposite end of link 37 is connected to a support 40, which may be rotated about point 39 as a center, and locked in a given position. The force transmitted to lever 10 is a function of the angle between link 37 and a vertical line passing through the bearing 39.

The cam follower lever, as shown, is in the form of a bell crank having the main arm 34, on which a roller 44 is journalled. A roller bearing 44' may be provided for the roller. The roller 44 will follow the cam surfaces of cams 33 or 32, whichever is in engagement with the roller. The bell crank also is provided with a relatively short arm 45, and an adjustable arm 46. The short arm 45 is provided with a screw 47, by means of which the arm 46 may be adjusted, to produce in spring 35 the initial tension that may be required.

As may be seen in Fig. 1, diaphragm 2 responds to the pressure difference across an orifice 46' in a pipe 47'. That pressure difference represents, for purposes of illustration, the condition to which the diaphragm 2 responds. If the pressure drop or difference across orifice 46' is increasing, the diaphragm 2 will deflect to the left, as seen in Fig. 1, thereby causing the lever systems 9 and 10 to turn in a clockwise direction about its bearing point on the sealing diaphragm 12.

As shown in Fig. 2, the cam levers 32 and 33 are journalled on a stub shaft 50 that is screwed into a boss 51, which is a part of a wall 52, comprising the case for the mechanism shown in Fig. 1. Shaft 50 may be provided with anti-friction bearings, such as ball bearings 53 and 54.

The cam levers 32 and 33, as stated above, are connected to diaphragm 27 by link 31 and the clevis 31'. The clevis is secured to the cam levers 32 and 33 by a pin 54 that extends through the clevis and the cam levers, as shown in Fig. 3. The clevis pin may be provided with anti-friction bearings, such as ball bearings 56 and 57.

As shown in Fig. 4, bell crank lever 34 is mounted on a stub shaft 58, that is screwed into a boss 59, forming a part of the regulator case. The shaft 58 may be provided with ball bearings 60 for lever 34. The lever 46, as shown in Fig. 4, is pivoted on a pin 61, that extends through the lever 34 and is threaded into lever 46. Pin 61 may also be provided with anti-friction bearings, such as ball bearings 60, for the lever 34.

In the form of cam changer or selector embodied in the invention as illustrated in Figs. 1 to 4, the cam follower roller 44 is movable relative to the cam levers 32 and 33. Specifically, the cam roller 44 is arranged to be moved from one cam to the other. In order to accomplish the shifting of the cam follower roller 44, so that it may be selectively caused to engage one or the other of the cam levers, roller 44 is mounted on a shaft 64 provided with a knurled hand wheel 65. Shaft 64 is threaded through the free end of bell crank 34, as shown. Shaft 64 is provided with a stop collar 66, which acts to limit movement of roller 44 to the left, or to the position where it engages cam lever 33. By turning shaft 64 in one direction, cam follower roller 44 may be advanced to the right to a position where it engages the cam lever 32.

For purposes of explanation, it may be assumed that the cam surface on cam lever 33 is so shaped that the restraining force applied to diaphragm 2 through lever 10, will be linear with the values of pressure difference applied to diaphragm 2. By having a cam surface of this shape, it follows that, as the pressure difference on diaphragm 2 increases from zero to some maximum predetermined value, the pressure output of valve 15, as delivered to diaphragm housing 28, will be linearly proportional to the pressure difference.

Also, for the sake of explanation, it may be assumed that the shape of the cam surface on cam lever 32 is such that the opposing force exerted by diaphragm 27 through the cam levers and the linkages on diaphragm 2, will be such that the pressure output of valve 15 will vary as an exponential function of the pressure difference acting on diaphragm 2. For example, if it is desired to have a value of pressure that is linearly proportional to the flow that produces the pressure differential, then the surface 32 will be such as to effectively take the square root of the pressure difference acting on diaphragm 2. In that case, the pressure output of valve 15, as delivered to diaphragm 27, will be linearly proportional to the flow, being the square root of the pressure difference, whereas, if the other cam were employed, the pressure output of valve 15 would be linearly proportional to the pressure difference.

By the arrangement illustrated in Figs. 1 to 4, it will be apparent that the output of the valve 15 may be caused to bear one relationship or another to the condition to be measured or regulated, which is applied to the diaphragm 2. The required operating characteristics may be obtained by merely returning both cams 32 and 33 to their zero position, which is the position indicated in the drawings. When in that position, turning the hand wheel 65 will shift the cam follower roller 44 from one to the other of the cams.

The above described construction has advantages in combustion control systems, where there may be two fuels available for combustion—for example, oil and gas. When burning one of these fuels, the output of the valve 15, with respect to the pressure applied to diaphragm 2, should be either linear with the pressure difference, or proportional to the square root or some other exponential function thereof. The changeover can be effected quickly and easily without resorting to the practice of changing cams, as has heretofore been the case.

In Fig. 5, a modified form of the invention shown in Figs. 1 to 4 is illustrated. In Fig. 5, numeral 68 represents a wall of the regulator case. The inner face of that wall has a hollow boss 69, through which a shaft 70 extends. The outer end of the shaft is provided with threads 71, that run through a threaded nut 72, secured to the case wall 68. On the extreme outer end of shaft 70 is a sprocket wheel 73, over which a sprocket chain 74, or other suitable drive, runs. The chain runs over another sprocket 75, mounted on a shaft 76. Shaft 76 extends through the front plate or panel 78, on which the machine may be mounted. To the shaft 76 is attached a hand wheel or knob 79, by which the shaft 70 may be turned in one direction or the other.

On the inner end of shaft 70, bell crank lever 34' is mounted. The bell crank lever 34' carries a cam follower roller 44". The cam follower roller 44" is arranged to cooperate with either cam lever 32 or 33.

In the illustration of the invention in Figs. 1 to 4, the cam follower roller is moved relative to the cam levers 32 and 33, and to the bell crank lever 34. In the form shown in Fig. 5, bell crank lever 34' and the follower roller 44" are moved as a unit.

In order to shift the bell crank lever 34' and its follower roller 44" only when the cams 32 and 33 are in zero position, the free end of the hollow boss 69 is provided with a groove 80 and a web 81 near the free end of boss 69. The web is provided with a slot 82, corresponding to the zero position of the cams or the bell crank lever 34'. Attached to the bell crank arm 34' is a segment 83 provided with a flange 84, having a depending tongue 85. When the cams are in zero position, the tongue 85 will be in alignment with the slot 82. When in that position, the shaft 70 may be turned by knob 79 until it has moved axially of the hollow boss 69, a distance sufficient to advance the tongue 83 through the slot 82. Thus, if the bell crank lever 34' is in the full line position shown in Fig. 5, and the lever is in zero position, then, by further turning of the knob 79, the shaft 70 will advance from right to left until the roller 44" on lever 34' engages cam lever 33. To return the cam follower roller 44" and lever 34' to the position shown in full lines, the hand wheel 79 is turned in the opposite direction, the lever 34' having first been put in zero position, until the tongue 85 passes through the slot 82, at which time further turning of the knob 79 will cause the bell crank lever 34' to be moved to the position shown in full lines.

As shown in Fig. 6, the front face of the front plate or panel may be provided with stay clamps 88 and 89, to limit turning of the knob 79 to one or the other of its positions. Stay clamp 88 may correspond to that position where the machine 1 will operate to regulate an oil burner, and stay clamp 89 corresponds to the position of knob 79 when the regulator controls the operation of a gas burner.

Having thus described the invention, it will be apparent to those skilled in this art, that various modifications and changes may be made in the illustrated embodiments thereof without departing from either the spirit or the scope of the invention.

Therefore, what is claimed as new and desired to be secured by Letters Patent is:

1. A variable condition responsive device provided with means responsive to said variable condition and to develop a force proportional to the magnitude thereof, means actuated by said condition responsive means for establishing an output quantity whose magnitude varies with said variable condition, means responsive to said output for developing a force proportional to said output, and means for connecting said output responsive means to said condition responsive means in force opposing relation thereto, said connecting means comprising a plurality of pivotally mounted cams, each cam having a differently shaped cam surface, means connecting the cams to said output responsive means, a bell crank having a follower disposed to engage one or another of said cams, a linkage connecting said bell crank to said variable condition responsive means, and means for shifting the bell crank and cam follower relative to the cams to effect engagement of said follower with one or another of said cams only when the cams are in a predetermined position.

2. A device according to claim 1 characterized by the fact that said cams have a common zero point, and that means are provided for shifting said cam follower and bell crank relative to said cams to or from engagement with one or another of the cams only when the cams are in zero position.

References Cited in the file of this patent

UNITED STATES PATENTS

| | | |
|---|---|---|
| 821,321 | Walsh | May 22, 1906 |
| 1,638,102 | Roucka | Aug. 9, 1927 |
| 1,666,270 | Soderberg | Apr. 17, 1928 |
| 2,220,180 | Spitzglass et al. | Nov. 5, 1940 |
| 2,352,312 | Donaldson | June 27, 1944 |
| 2,388,457 | Ziegler | Nov. 6, 1945 |
| 2,408,685 | Rosenberger | Oct. 1, 1946 |
| 2,517,079 | Birdsall | Aug. 1, 1950 |
| 2,536,184 | Johnson | Jan. 2, 1951 |